(12) United States Patent
Goda et al.

(10) Patent No.: US 8,420,728 B2
(45) Date of Patent: Apr. 16, 2013

(54) FIBER-REINFORCED RESIN COMPOSITION AND MOLDED BODY THEREOF

(75) Inventors: Hirofumi Goda, Kisarazu (JP); Toru Iwashita, Chiba (JP); Keita Itakura, Ichihara (JP)

(73) Assignees: Mitsui Chemicals, Inc., Tokyo (JP); Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/604,808

(22) Filed: Sep. 6, 2012

(65) Prior Publication Data

US 2013/0059966 A1    Mar. 7, 2013

Related U.S. Application Data

(62) Division of application No. 13/121,384, filed as application No. PCT/JP2009/066765 on Sep. 28, 2009.

(30) Foreign Application Priority Data

Sep. 30, 2008  (JP) ................. 2008-253384
Sep. 30, 2008  (JP) ................. 2008-254206

(51) Int. Cl.
*C08K 3/40* (2006.01)

(52) U.S. Cl.
USPC ............................ 524/494; 524/495; 524/496

(58) Field of Classification Search ........... 524/494–496
See application file for complete search history.

(56) References Cited

U.S. PATENT DOCUMENTS

| | | | |
|---|---|---|---|
| 3,742,106 | A | 6/1973 | Price |
| 4,864,964 | A | 9/1989 | Hilakos |
| 4,883,625 | A | 11/1989 | Glemet et al. |
| 4,957,422 | A | 9/1990 | Glemet et al. |
| 5,194,184 | A | 3/1993 | Takeyama et al. |
| 5,948,473 | A | 9/1999 | Saito et al. |
| 5,985,973 | A | 11/1999 | Sumitomo et al. |
| 6,309,997 | B1 | 10/2001 | Fujita et al. |
| 6,406,061 | B1 | 6/2002 | Nishijima et al. |
| 6,505,855 | B2 | 1/2003 | Nishijima et al. |
| 6,520,901 | B2 | 2/2003 | Nishijima et al. |
| 6,639,018 | B2 | 10/2003 | Yunoki et al. |
| 6,770,723 | B2 | 8/2004 | Fujita et al. |
| 6,875,718 | B2 | 4/2005 | Fujita et al. |
| 6,939,928 | B1 | 9/2005 | Kawai et al. |
| 6,984,699 | B2 | 1/2006 | Niino |
| 7,300,903 | B2 | 11/2007 | Fujita et al. |
| 7,449,533 | B2 | 11/2008 | Kawai et al. |
| 2002/0115779 | A1 | 8/2002 | Saito et al. |
| 2002/0156176 | A1 | 10/2002 | Saito et al. |
| 2005/0119392 | A1 | 6/2005 | Makagawa et al. |
| 2007/0087193 | A1 | 4/2007 | Lee et al. |
| 2010/0280153 | A1 | 11/2010 | Itakura et al. |
| 2011/0040022 | A1 | 2/2011 | Goda et al. |

FOREIGN PATENT DOCUMENTS

| | | |
|---|---|---|
| JP | 46-004545 A | 11/1971 |
| JP | 61-118235 A | 6/1986 |
| JP | 62-060625 A | 3/1987 |
| JP | 63-132036 A | 6/1988 |
| JP | 63-264326 A | 11/1988 |
| JP | 01-208118 A | 8/1989 |
| JP | 06-114830 A | 4/1994 |
| JP | 10-264152 A | 10/1998 |
| JP | 11-071431 A | 3/1999 |
| JP | 11-315109 A | 11/1999 |
| JP | 2001-139702 A | 5/2001 |
| JP | 2002-234976 A | 8/2002 |
| JP | 2002-249624 A | 9/2002 |
| JP | 2003147159 | 5/2003 |
| JP | 2003-226791 A | 8/2003 |
| JP | 2003-253563 A | 9/2003 |
| JP | 2004-300293 A | 10/2004 |
| JP | 2006-193735 A | 7/2006 |
| JP | 2006193735 | 7/2006 |
| JP | 2008-074405 A | 4/2008 |
| JP | 2008078838 | 7/2008 |
| JP | 2008179785 | 7/2008 |
| JP | 2008-179784 A | 8/2008 |
| JP | 2008-179785 A | 8/2008 |
| WO | WO-97/19805 A1 | 6/1997 |
| WO | WO-01/27124 A1 | 4/2001 |
| WO | WO 2009/088033 A1 | 7/2009 |
| WO | WO 2009/116608 A1 | 9/2009 |
| WO | WO 2011/030784 A1 | 3/2011 |

OTHER PUBLICATIONS

Die Makromolekulare Chemie, 177, pp. 213-231 (1976).
International Search Report issued for PCT/JP2009/066765; 1 pp., issued Dec. 15, 2009.
J. Polym. Sci., Part A-2, Polymer Physics, vol. 8, No. 10, pp. 1803-1821 (1970).
Seikei Kakou, 1989, vol. 1, No. 4, pp. 355-363 with partial English translation.
Non-Final Office Action U.S. Appl. No. 13/121,384 dated Feb. 22, 2012.
Non-Final Office Action U.S. Appl. No. 13/121,384 dated Aug. 6, 2012.
Supplementary European Search Report EP 09 81 7731 dated Aug. 1, 2012.

*Primary Examiner* — Peter Szekely
(74) *Attorney, Agent, or Firm* — Foley & Lardner LLP (57) ABSTRACT

Long-fiber-reinforced thermoplastic resin particles and a blend thereof are provided, wherein the opening property of the reinforcing fibers during molding is good, and a molded body exhibiting an excellent appearance and having high mechanical strength is obtained. The particles (A) contain a thermoplastic resin (A1), produced by using a metallocene catalyst, a modified polyolefin resin (A2) modified with an unsaturated carboxylic acid or a derivative thereof, and reinforcing fibers (A3) and satisfying additional requirements described herein.

7 Claims, 3 Drawing Sheets

FIBER-REINFORCED RESIN COMPOSITION AND MOLDED BODY THEREOF

CROSS REFERENCE TO RELATED APPLICATIONS

This application is a divisional application of U.S. Ser. No. 13/121,384 filed Sep. 28, 2009, which is the U.S. National Phase of PCT/JP2009/066765 filed Sep. 28, 2009, which claims priority from Japanese Patent Application Nos. 2008-254206 and 2008-253384 filed Sep. 30, 2008.

The subject matter of each is incorporated by reference in entirety.

TECHNICAL FIELD

The present invention relates to a fiber-reinforced resin composition and a molded body thereof. In particular, the present invention relates to long-fiber-reinforced thermoplastic resin particles, a long-fiber-reinforced thermoplastic resin particle blend, and a molded body thereof.

BACKGROUND ART

Many molded bodies formed from long-fiber-reinforced resin compositions have been used as automobile module parts required to have high strength. However, in some cases, reinforcing fibers appear in lumps on a module part surface due to poor dispersion of reinforcing fibers contained in the long-fiber-reinforced resin composition. Consequently, it is necessary that the module part formed from the long-fiber-reinforced resin composition is used as a part of a portion where a required level of appearance is low or is used after painting is applied to the surface thereof.

In order to solve the above-described problems, a fiber-reinforced resin composition has been reported, wherein an appearance of the resulting molded body has been improved (refer to PTLs 1 to 4).

For example, PTLs 3 and 4 report long-fiber-reinforced resin compositions produced by melt-kneading a combination of a propylene polymer having a narrow molecular weight distribution and a propylene polymer having a wide molecular weight distribution together with reinforcing fibers, as well as pellets and a molded body formed from the composition. However, an improvement in dispersibility of the reinforcing fibers contained in the long-fiber-reinforced resin composition and a high level of appearance required of an automobile module part produced through injection molding are not completely satisfied. Consequently, further improvement in appearance has been required.

Citation List
Patent Literature

PTL 1: Japanese Unexamined Patent Application Publication No. 2004-300293
PTL 2: Japanese Unexamined Patent Application Publication No. 2006-193735
PTL 3: Japanese Unexamined Patent Application Publication No. 2008-179784
PTL 4: Japanese Unexamined Patent Application Publication No. 2008-179785

SUMMARY OF INVENTION

Technical Problem

It is an object of the present invention to provide long-fiber-reinforced thermoplastic resin particles and a long-fiber-reinforced thermoplastic resin particle blend, wherein the opening property of the reinforcing fibers during molding is good, and a molded body exhibiting an excellent appearance and having high mechanical strength, e.g., bending strength, is obtained.

Solution to Problem

The present inventors conducted intensive research. As a result, it was found that long-fiber-reinforced thermoplastic resin particles containing a thermoplastic resin produced by using a metallocene catalyst, a modified polyolefin resin, and reinforcing fibers, or a long-fiber-reinforced thermoplastic resin particle blend formed from the long-fiber-reinforced thermoplastic resin particles and polyolefin resin particles for dilution exhibited a good opening property of the reinforcing fibers during molding and was able to provide a molded body exhibiting an excellent appearance and having excellent mechanical strength. Consequently, the present invention has been completed.

That is, the present invention includes the following items.

[1] Long-fiber-reinforced thermoplastic resin particles (A) characterized by including a thermoplastic resin (A1) produced by using a metallocene catalyst, a modified polyolefin resin (A2) modified with an unsaturated carboxylic acid or a derivative thereof, and reinforcing fibers (A3), wherein the following requirements (1) to (5) are satisfied.

(1) The amount of modification of the unsaturated carboxylic acid or a derivative thereof is 0.01 to 2 percent by weight in 100 percent by weight of the total of the thermoplastic resin (A1) and the modified polyolefin resin (A2).
(2) The total of the thermoplastic resin (A1) and the modified polyolefin resin (A2) constitute 20 to 70 percent by weight in 100 percent by weight of the total of the thermoplastic resin (A1), the modified polyolefin resin (A2), and the reinforcing fibers (A3).
(3) The reinforcing fibers (A3) constitute 30 to 80 percent by weight in 100 percent by weight of the total of the thermoplastic resin (A1), the modified polyolefin resin (A2), and the reinforcing fibers (A3).
(4) When 25 g of the long-fiber-reinforced thermoplastic resin particles (A) are encapsulated in a 20-L chamber and are stood at 65° C. for 1 hour, the amount of acetaldehyde dissipated from the long-fiber-reinforced thermoplastic resin particles (A) is 3.0 μg/m$^3$ or less.
(5) The melting point of the resin component in the long-fiber-reinforced thermoplastic resin particles (A) is 150° C. or higher.

[2] The long-fiber-reinforced thermoplastic resin particles (A) according to the item [1], characterized in that the thermoplastic resin (A1) constitutes 75 to 99 percent by weight and the modified polyolefin resin (A2) constitutes 1 to 25 percent by weight in 100 percent by weight of the total of the above-described thermoplastic resin (A1) and the above-described modified polyolefin resin (A2).

[3] The long-fiber-reinforced thermoplastic resin particles (A) according to the item [1] or item [2], characterized in that the above-described thermoplastic resin (A1) satisfies the following requirements (a-1), (a-2), and (a-3).

(a-1) The melt index (MI; resin temperature 230° C., load 21.18 N) is within the range of 100 to 250 g/10 min.
(a-2) The amount of components soluble into o-dichlorobenzene at 90° C. measured by cross fractionation chromatography (CFC method) is 1 percent by weight or less.
(a-3) The molecular weight distribution (Mw/Mn) is less than 3.5.

[4] The long-fiber-reinforced thermoplastic resin particles (A) according to any one of the items [1] to [3], characterized in that the above-described thermoplastic resin (A1) is at least one type of polymer selected from propylene homopolymers and propylene-α-olefin random copolymers.

[5] A long-fiber-reinforced thermoplastic resin particle blend (C) characterized by including 10 to 90 percent by weight of long-fiber-reinforced thermoplastic resin particles (A) according to any one of the items [1] to [4], and 90 to 10 percent by weight of polyolefin resin particles (B) for dilution (where the total of the long-fiber-reinforced thermoplastic resin particles (A) and the polyolefin resin particles (B) for dilution is assumed to be 100 percent by weight).

[6] The long-fiber-reinforced thermoplastic resin particle blend (C) according to the item [5], characterized in that the reinforcing fibers (A3) constitute 5 to 60 percent by weight in 100 percent by weight of the total of the above-described long-fiber-reinforced thermoplastic resin particles (A) and the above-described polyolefin resin particles (B) for dilution.

[7] The long-fiber-reinforced thermoplastic resin particle blend (C) according to the item [5] or item [6], characterized in that the above-described polyolefin resin particles (B) for dilution satisfy the following requirements (b-1), (b-2), and (b-3).
(b-1) The melt index (MI; resin temperature 230° C., load 21.18 N) is within the range of 20 to 70 g/10 min.
(b-2) The relaxation time $\lambda$ is 0.3 seconds or shorter, where the angular frequency $\omega=1$ (rad/sec), which is calculated from the storage modulus G' and the loss modulus G" measured with a cone & plate rheometer.
(b-3) The molecular weight distribution (Mw/Mn) is within the range of 2.5 to 6.0.

[8] A molded body produced through molding by using long-fiber-reinforced thermoplastic resin particles (A) according to any one of the items [1] to [4].

[9] A molded body produced through molding by using long-fiber-reinforced thermoplastic resin particle blend (C) according to any one of the items [5] to [7].

Advantageous Effects of Invention

According to the present invention, the long-fiber-reinforced thermoplastic resin particles and the long-fiber-reinforced thermoplastic resin particle blend, from which a molded body exhibiting an excellent appearance and having high mechanical strength is obtained, can be provided.

According to the present invention, the long-fiber-reinforced thermoplastic resin particle dry blend formed from the long-fiber-reinforced thermoplastic resin particles containing a thermoplastic resin having high fluidity and the polyolefin resin particles for dilution having low fluidity is used and, thereby, an injection-molded body is obtained, wherein the opening property of the reinforcing fibers in an injection cylinder is good and raising of fiber lumps on the molded body surface is suppressed during injection molding.

Furthermore, the molded body according to the present invention is used for automobile parts favorably because a volatile organic compound (VOC) is not generated.

DESCRIPTION OF EMBODIMENTS

Long-fiber-reinforced thermoplastic resin particles (A), a long-fiber-reinforced thermoplastic resin particle blend (C) (hereafter may be simply referred to as a "resin blend (C)"), and a molded body thereof according to the present invention will be described below in detail.

[Long-Fiber-Reinforced Thermoplastic Resin Particles (A)]

Long-fiber-reinforced thermoplastic resin particles (A) according to the present invention are characterized by including a thermoplastic resin (A1) produced by using a metallocene catalyst, a modified polyolefin resin (A2) modified with an unsaturated carboxylic acid or a derivative thereof, and reinforcing fibers (A3), wherein the following requirements (1) to (5) are satisfied.
(1) The amount of modification of the unsaturated carboxylic acid or a derivative thereof is 0.01 to 2 percent by weight in 100 percent by weight of the total of the thermoplastic resin (A1) and the modified polyolefin resin (A2).
(2) The thermoplastic resin (A1) and the modified polyolefin resin (A2) constitute 20 to 70 percent by weight in 100 percent by weight of the total of the thermoplastic resin (A1), the modified polyolefin resin (A2), and the reinforcing fibers (A3).
(3) The reinforcing fibers (A3) constitute 30 to 80 percent by weight in 100 percent by weight of the total of the thermoplastic resin (A1), the modified polyolefin resin (A2), and the reinforcing fibers (A3).
(4) When 25 g of the long-fiber-reinforced thermoplastic resin particles (A) are encapsulated in a 20-L chamber and are stood at 65° C. for 1 hour, the amount of acetaldehyde dissipated from the long-fiber-reinforced thermoplastic resin particles (A) is 3.0 µg/m³ or less.
(5) The melting point of the resin component in the long-fiber-reinforced thermoplastic resin particles (A) is 150° C. or higher.

<Thermoplastic Resin (A1)>

As for the thermoplastic resin (A1) according to the present invention, for example, polyolefin based resins, polystyrene based resins, and the like can be used. Specific examples of polyolefin based resins include polypropylene based resins, e.g., propylene homopolymers and propylene-α-olefin random copolymers, and 4-methyl-1-pentene polymer resin. Here, specific examples of α-olefins include ethylene, 1-butene, 1-pentene, 1-hexene, and 1-octene. Particularly preferable examples include ethylene and 1-butene. One type of α-olefin may be used alone, or at least two types may be used in combination. Among them, polypropylene based resins are preferable, and in particular, propylene homopolymers are preferable from the viewpoint of the moldability and the heat resistance. Specific examples of polystyrene based resins include syndiotactic polystyrenes.

As for a method for manufacturing the thermoplastic resin (A1), a publicly known manufacturing method is used, in which a metallocene catalyst containing a metallocene compound including a ligand having a cyclopentadienyl skeleton in the molecule is employed. For example, manufacturing methods described in International Publication No. 01/27124, Japanese Unexamined Patent Application Publication No. 11-315109, and the like can be employed. Examples of metallocene compounds include two types, that is, metallocene compounds represented by the following general formula [I] and cross-linked metallocene compounds represented by the following general formula [II], from the viewpoint of the chemical structure. Among them, the cross-linked metallocene compounds are preferable.

[Chemical formula 1]

In the above-described general formulae [I] and [II], M represents a titanium atom, a zirconium atom, or a hafnium atom, Q represents a halogen atom, a hydrocarbon group, or a group selected from an anionic ligand and a neutral ligand capable of coordinating with a lone electron pair, j represents an integer of 1 to 4, and $Cp^1$ and $Cp^2$ represent a cyclopentadienyl group or a substituted cyclopentadienyl group, where $Cp^1$ and $Cp^2$ may be the same or different and form a sandwich structure while sandwiching M. Here, the substituted cyclopentadienyl group refers to an indenyl group, a fluorenyl group, an azulenyl group, or any one of these groups, in which at least one hydrocarbyl group or silicon-containing group is included as a substituent. In the case where the substituted cyclopentadienyl group is the indenyl group, the fluorenyl group, or the azulenyl group, a part of double bonds of an unsaturated ring condensed to the cyclopentadienyl group may be hydrogenated. In the general formula [II], Y represents a divalent hydrocarbon group having the carbon number of 1 to 20, a divalent halogenated hydrocarbon group having the carbon number of 1 to 20, a divalent silicon-containing group, a divalent germanium-containing group, a divalent tin-containing group, —O—, —CO—, —S—, —SO—, —SO$_2$—, —Ge—, —Sn—, —NR$^a$—, —P(R$^a$)—, —P(O) (R$^a$)—, —BR$^a$—, or —AlR$^a$— (where R$^a$ represents a hydrocarbon group having the carbon number of 1 to 20, a halogenated hydrocarbon group having the carbon number of 1 to 20, a hydrogen atom, a halogen atom, or a nitrogen compound residue, in which a nitrogen atom is bonded to one or two hydrocarbon groups having the carbon number of 1 to 20 while the two may be the same or different).

The metallocene compound favorably used in the present invention is a cross-linked metallocene compound represented by the following general formula [III] disclosed by the present applicant in International Publication No. 01/27124 among the cross-linked metallocene compounds represented by the above-described general formula [II]. The polymerization catalyst used in the present invention is a metallocene catalyst composed of a cross-linked metallocene compound represented by the general formula [III], an organometallic compound, an organoaluminumoxy compound, a compound capable of forming an ion pair through reaction with a metallocene compound and, in addition, a particulate carrier, as necessary.

[Chemical formula 2]

In the above-described general formula [III], $R^1$ to $R^{14}$ represent individually a hydrogen atom, a hydrocarbon group, or a silicon-containing group, while they may be the same or different. Here, examples of hydrocarbon groups include straight chain hydrocarbon groups, e.g., a methyl group, an ethyl group, a n-propyl group, an allyl group, a n-butyl group, a n-pentyl group, a hexyl group, a n-heptyl group, a n-octyl group, a n-nonyl group, and a n-decanyl group; branched hydrocarbon groups, e.g., an isopropyl group, a t-butyl group, an amyl group, a 3-methyl pentyl group, a 1,1-diethyl propyl group, a 1,1-dimethyl butyl group, a 1-methyl-1-propyl butyl group, a 1,1-propyl butyl group, a 1,1-dimethyl-2-methyl propyl group, and a 1-methyl-1-isopropyl-2-methyl propyl group; cyclic saturated hydrocarbon groups, e.g., a cyclopentyl group, a cyclohexyl group, a cycloheptyl group, a cyclooctyl group, a norbornyl group, and an adamantyl group; cyclic unsaturated hydrocarbon groups, e.g., a phenyl group, a tolyl group, a naphthyl group, a biphenyl group, a phenanthryl group, and an anthracenyl group; saturated hydrocarbon groups including cyclic unsaturated hydrocarbon groups, e.g., a benzyl group, a cumyl group, a 1,1-diphenyl ethyl group, and a triphenyl methyl group, as substituents; and hetero atom-containing hydrocarbon groups, e.g., a methoxy group, an ethoxy group, a phenoxy group, a furyl group, a N-methylamino group, a N,N-dimethylamino group, a N-phenylamino group, a pyrryl group, and a thienyl group. Examples of silicon-containing groups include a trimethylsilyl group, a triethylsilyl group, a dimethylphenylsilyl group, a diphenylmethylsilyl group, and a triphenylsilyl group. In this regard, adjacent groups among $R^5$ to $R^{12}$ may be mutually bonded to form a ring. Specific examples of substituted fluorenyl groups having $R^5$ to $R^{12}$ include a benzofluorenyl group, a dibenzofluorenyl group, an octahydrodibenzofluorenyl group, an octamethyloctahydrodibenzofluorenyl group, and an octamethyltetrahydrodicyclopentafluorenyl group.

In the general formula [III], $R^1$ to $R^4$ bonded to a cyclopentadienyl ring as substituents are preferably a hydrogen atom or a hydrocarbon group having the number of carbon atoms of 1 to 20. More preferably, $R^2$ and $R^4$ are a hydrocarbon group having the number of carbon atoms of 1 to 20. Particularly preferably, $R^1$ and $R^3$ are a hydrogen atom, and $R^2$ and $R^4$ are a straight chain or branched alkyl group having the number of carbon atoms of 1 to 5.

In the general formula [III], $R^5$ to $R^{12}$ bonded to a fluorene ring as substituents are preferably a hydrogen atom or a hydrocarbon group having the number of carbon atoms of 1 to 20. Examples of hydrocarbon groups having the number of carbon atoms of 1 to 20 include the same hydrocarbon groups as those described above. Adjacent groups among $R^5$ to $R^{12}$ may be mutually bonded to form a ring, $R^6$ and $R^7$ are preferably a fluorene ring, where the two are not hydrogen atoms at the same time, and $R^{10}$ and $R^{11}$ are preferably a fluorene ring, where the two are not hydrogen atoms at the same time.

In the general formula [III], Y cross-liking the cyclopentadienyl ring and the fluorenyl ring is a group 14 element, and preferably a carbon atom, a silicon atom, or a germanium atom, and more preferably a carbon atom. Furthermore, $R^{13}$ and $R^{14}$ bonded to Y as substituents are individually a hydrocarbon group having the number of carbon atoms of 1 to 20, preferably an alkyl group having the number of carbon atoms of 1 to 3 or an aryl group having the number of carbon atoms of 6 to 20, and more preferably a methyl group, an ethyl group, a phenyl group, or a tolyl group. The groups $R^{13}$ and $R^{14}$ may be the same or different and may be bonded to each other to form a ring. Moreover, $R^{13}$ and $R^{14}$ may be bonded to an adjacent group among $R^5$ to $R^{12}$ or an adjacent group among $R^1$ to $R^4$ to form a ring.

In the general formula [III], M represents a group 4 transition metal, and preferably a titanium atom, a zirconium atom, or a hafnium atom, Q represents a halogen atom, a hydrocarbon group, or a group selected from an anionic ligand and a neutral ligand capable of coordinating with a lone electron pair, and j represents an integer of 1 to 4. In the case where j is 2 or more, Qs may be mutually the same or different. As for the halogen atom, a fluorine atom, a chlorine atom, a bromine atom, and an iodine atom are mentioned, and specific examples of the hydrocarbon groups include the same groups as those described above. Specific examples of anionic ligands include alkoxy groups of methoxy, t-butoxy, phenoxy, and the like; carboxylate groups of acetate, benzoate, and the like; and sulfonate groups of mesylate, tosylate, and the like. Specific examples of neutral ligands capable of coordinating with a lone electron pair include organic phosphorus compounds, e.g., trimethyl phosphine, triethyl phosphine, triphenyl phosphine, and diphenylmethyl phosphine; and ethers, e.g., tetrahydrofuran, diethyl ether, dioxane, and 1,2-dimethoxyethane. It is preferable that at lest one of Qs is a halogen atom or an alkyl group.

Examples of cross-linked metallocene compounds favorably used in the present invention include dimethylmethylene (3-t-butyl-5-methylcyclopentadienyl)(3,6-di-t-butylfluorenyl)zirconium dichloride, 1-phenylethylidene(4-t-butyl-2-methylcyclopentadienyl)(octamethyloctahydrodibenzofluorenyl)zirconium dichloride, and [3-(1',1',4',4',7',7',10',10'-octamethyloctahydrodibenzo[b,h]fluorenyl)(1,1,3-trimethyl-5-t-butyl-1,2,3,3a-tetrahydropentalene)]zirconium dichloride.

As for the organometallic compound, the organoaluminumoxy compound, and the compound capable of forming an ion pair through reaction with the metallocene compound (cocatalyst) and, in addition, the particulate carrier which is used as necessary, used together with the metallocene compound represented by the general formula [III], the above-described compounds disclosed in International Publication No. 01/27124 and Japanese Unexamined Patent Application Publication No. 11-315109 can be used with no specific limitation.

In a manufacturing example, as described later, in the examples according to the present invention, a propylene homopolymer is produced by performing prepolymerization in the copresence of [3-(1',1',4',4',7',7',10',10'-octamethyloctahydrodibenzo[b,h]fluorenyl) (1,1,3-trimethyl-5-t-butyl-1, 2,3,3a-tetrahydropentalene)]zirconium dichloride, which serves as the metallocene compound represented by the general formula (III) and which is represented by the following formula (A), and a solid catalyst, in which methylaluminoxane is held by a silica carrier, and triethylaluminum serving as cocatalysts, and subsequently performing polymerization composed of a plurality of stages.

[Chemical formula 3]

(A)

The polymerization method is not specifically limited. For example, homopolymerization, copolymerization, multistage polymerization, and the like are used.

In the case where the polypropylene based resin is used as the thermoplastic resin (A1) according to the present invention, for the purpose of improving the impact resistance, an elastomer may be added, as necessary, and a form of polypropylene based resin composition may be employed in the use. Examples of elastomers include propylene-α-olefin copolymers, ethylene-α-olefin nonconjugated polyene random copolymers, hydrogenated block copolymers, other elastomeric polymers, e.g., ethylene-α-olefin random copolymer, and mixtures thereof. As for the α-olefin, the same α-olefins as the above-described α-olefins to constitute the polyolefin based resin can be used. One type thereof may be used alone, or at least two types may be used in combination.

As for the method for manufacturing the above-described polypropylene based resin composition, a physical blending method, for example, a melt-blending method, is mentioned. The melt-blending method is a method for performing mechanical kneading while heating and plasticization are performed by using a mixing roll, a Banbury mixer, a uniaxial or biaxial extruder, or the like.

Alternatively, in the case where the above-described polypropylene based resin composition is composed of a polypropylene based resin and a propylene-α-olefin copolymer, production may be performed in the form of production of a propylene-α-olefin block copolymer besides the production by the physical blending method. The production of the propylene-α-olefin block copolymer is performed by continuously conducting the following two steps (Step 1 and Step 2).

[Step 1] A step to produce a propylene homopolymer or a propylene-α-olefin copolymer by (co)polymerizing propylene and, as necessary, at least one type of olefin selected from ethylene and α-olefins having the carbon number of 4 or more in the presence of a metallocene compound-containing catalyst.

[Step 2] A step to produce a propylene-α-olefin copolymer containing ethylene and the α-olefin having the carbon number of 4 or more at a content larger than that in Step 1 by copolymerizing propylene and at least one type of olefin selected from ethylene and α-olefins having the carbon number of 4 or more in the presence of a metallocene compound-containing catalyst.

As for the thermoplastic resin (A1) according to the present invention, one type of the above-described resins may be used alone, or at least two types may be used in combination.

The melting point of a resin component in the long-fiber-reinforced thermoplastic resin particles (A) is 150° C. or higher, preferably 150° C. to 163° C., and more preferably 156° C. to 162° C. If the melting point is lower than 150° C., the crystallinity is reduced and mechanical strength, e.g., bending strength at room temperature, may be reduced. In this regard, most of the above-described resin component is the thermoplastic resin (A1).

The melt index (MI; resin temperature 230° C., load 21.18 N) of thermoplastic resin (A1) is preferably 100 to 250 g/10 min, as in the item (a-1), and more preferably 100 to 150 g/10 min. In the case where the melt index of the thermoplastic resin (A1) is within the above-described range, during production of the long-fiber-reinforced thermoplastic resin particles (A) described later, the reinforcing fibers (A3) are impregnated with the thermoplastic resin (A1) easily and, thereby, the long-fiber-reinforced thermoplastic resin particles (A) with improved dispersibility of the reinforcing fibers (A3) is obtained. Therefore, if the melt index of the thermoplastic resin (A1) is less than 100 g/10 min, the reinforcing fibers may become difficult to open during molding. On the other hand, if the melt index of the thermoplastic resin (A1) exceeds 250 g/10 min, the strength of the long-fiber-reinforced thermoplastic resin particles (A) may be reduced.

In order to control the melt index of the thermoplastic resin (A1) within the above-described range, for example, the molecular weight may be adjusted by controlling the concentration of hydrogen introduced during the polymerization and the like, decomposition may be effected with a peroxide, or resins having different melt indexes may be blended or kneaded in the production of the thermoplastic resin (A1).

The amount of components soluble into o-dichlorobenzene at 90° C. measured by cross fractionation chromatography (CFC method) of the thermoplastic resin (A1) is preferably 1 percent by weight or less, as in the item (a-2), more preferably 0.5 percent by weight or less, and particularly preferably 0.3 percent by weight or less. The amount of elution at 90° C. or lower of 1 percent by weight or less refers to that the content of low-crystallinity and low-molecular weight components among polymer components constituting the thermoplastic resin (A1) is small and refers to that the thermoplastic resin (A1) has high heat resistance and high strength.

The present inventors produced a thermoplastic resin by using a Ziegler based catalyst, as described in Japanese Patent Application No. 2008-074405. Regarding the thermoplastic resin produced by using the Ziegler based catalyst, the amount of elution at 90° C. is about 3 to 10 percent by weight. That is, the thermoplastic resin produced by using the Ziegler based catalyst has a larger content of low-crystallinity, low-molecular weight components and exhibits poor heat resistance and low strength as compared with the thermoplastic resin (A1) according to the present invention.

The thermoplastic resin (A1) according to the present invention is characterized in that decomposition through addition of a peroxide is not necessary prior to production of the long-fiber-reinforced thermoplastic resin particles (A) because the molecular weight distribution (Mw/Mn) is made narrow due to characteristics of the metallocene catalyst and, therefore, the production step is efficient and almost no volatile organic compound (VOC) is generated in a decomposition step and the like due to addition of a peroxide.

The molecular weight distribution (Mw/Mn) in terms of standard polypropylene, measured by gel permeation chromatography (GPC) of the thermoplastic resin (A1), is preferably less than 3.5, as in the item (a-3), more preferably 1.5 to 3, and particularly preferably 2 to 2.7. If the molecular weight distribution (Mw/Mn) is 3.5 or more, the opening property of fibers during production of the long-fiber-reinforced thermoplastic resin particles (A) is degraded, lump-shaped poor appearance may occur on the surface of a molded body obtained by molding the long-fiber-reinforced thermoplastic resin particles (A). Furthermore, the number average molecular weight (Mn) is usually $2 \times 10^4$ to $12 \times 10^4$, preferably $3 \times 10^4$ to $10 \times 10^4$, and more preferably $4 \times 10^4$ to $8 \times 10^4$. The number average molecular weight (Mn) within the above-described range is favorable from the viewpoint of ensuring compatibility between an operating ease in fiber impregnation step and mechanical strength.

Regarding the content of the thermoplastic resin (A1), the thermoplastic resin (A1) and the modified polyolefin resin (A2) constitute 20 to 70 percent by weight, preferably 25 to 67 percent by weight, and more preferably 30 to 65 percent by weight in 100 percent by weight of the total of the thermoplastic resin (A1), the modified polyolefin resin (A2), and the reinforcing fibers (A3).

Furthermore, the content of the thermoplastic resin (A1) is preferably 25 to 59 percent by weight, more preferably 30 to 57 percent by weight, and particularly preferably 35 to 55 percent by weight in 100 percent by weight of the total of the thermoplastic resin (A1), the modified polyolefin resin (A2), and the reinforcing fibers (A3). If the content of the thermoplastic resin (A1) is less than 25 percent by weight, impregnation of the fiber may be reduced. On the other hand, if the content of the thermoplastic resin (A1) exceeds 59 percent by weight, production of the long-fiber-reinforced thermoplastic resin particles (A) according to the present invention may become difficult.

<Modified Polyolefin Resin (A2)>

The modified polyolefin resin (A2) modified with an unsaturated carboxylic acid or a derivative thereof, according to the present invention, has a functional group, e.g., a carboxyl group or a carboxylic acid anhydride group, in the polyolefin resin.

The type of the polyolefin resin to be modified is not specifically limited, and it is preferable that the same polyolefin resins as those described above for the thermoplastic resin (A1) are used. For example, in the case where a polypropylene based resin is used as the thermoplastic resin (A1), it is preferable that a modified polypropylene based resin is used as the modified polyolefin resin (A2).

In this regard, examples of modified polyolefin resins (A2) include modified propylene homopolymers, modified propylene-α-olefin random copolymers, and modified propylene-α-olefin block copolymers.

As for the method for modifying the polyolefin resin, graft modification and copolymerization can be employed.

Examples of unsaturated carboxylic acids used for modification include acrylic acid, methacrylic acid, maleic acid, nadic acid, fumaric acid, itaconic acid, crotonic acid, citraconic acid, sorbic acid, mesaconic acid, angelic acid, and phthalic acid. Furthermore, as for the derivatives thereof, acid anhydrides, esters, amides, imides, metal salts, and the like are mentioned. Examples thereof include maleic anhydride, itaconic acid anhydride, citraconic acid anhydride, nadic acid anhydride, phthalic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, and sodium methacrylate. Among them, unsaturated dicarboxylic acids and derivatives thereof are preferable. In particular, maleic anhydride and phthalic anhydride are preferable.

The amount of modification of the unsaturated carboxylic acid or a derivative thereof is 0.01 to 2 percent by weight, preferably 0.05 to 1.8 percent by weight, and more preferably 0.1 to 1.5 percent by weight in 100 percent by weight of the total of the thermoplastic resin (A1) and the modified polyolefin resin (A2).

Furthermore, the amount of addition of carboxylic acid in the modified polyolefin resin (A2) is usually 0.1 to 14 percent by weight, and preferably 0.8 to 8 percent by weight. The amount of addition of acid is determined from the area of a peak at 1,670 to 1,810 $cm^{-1}$ on the basis of measurement of the IR spectrum of the modified polyolefin resin.

The modification of the polyolefin resin may be performed prior to the production of the long-fiber-reinforced thermoplastic resin particles (A) or be performed during the melt-kneading process in the production of the particles (A) concerned.

For example, in the case where the modification is performed prior to the production of the above-described particles (A), when the long-fiber-reinforced thermoplastic resin particles (A) are prepared, an appropriate amount of acid-modified polyolefin resin or the like is added to the thermoplastic resin (A1).

In the case where the modification is performed during the melt-kneading process, the thermoplastic resin (A1), the polyolefin resin, and the unsaturated carboxylic acid or a derivative thereof are kneaded in an extruder by using an organic peroxide and, thereby, the polyolefin resin is modified through graft copolymerization with the unsaturated carboxylic acid or a derivative thereof.

In this regard, examples of the above-described organic peroxides can include benzoyl peroxide, lauroyl peroxide, azobisisobutyronitrile, dicumyl peroxide, t-butyl hydroperoxide, $\alpha,\alpha'$-bis(t-butyl peroxy diisopropyl)benzene, bis(t-butyldioxy isopropyl)benzene, 2,5-dimethyl-2,5-di(t-butyl peroxy)hexane, 2,5-dimethyl-2,5-di(t-butyl peroxy)hexyne-3, di-t-butyl peroxide, and cumene hydroperoxide.

The content of the modified polyolefin resin (A2) is preferably 1 to 5 percent by weight, and more preferably 1.5 to 3.5 percent by weight in 100 percent by weight of the total of the thermoplastic resin (A1), the modified polyolefin resin (A2), and the reinforcing fibers (A3). If the content of the modified polyolefin resin (A2) is less than 1 percent by weight, interfacial adhesion between the fibers and the resin is reduced and the strength may be reduced. On the other hand, if the content of the modified polyolefin resin (A2) exceeds 5 percent by weight, the molecular weight of the whole becomes small and the strength may be reduced.

Furthermore, it is preferable that the thermoplastic resin (A1) constitutes 75 to 99 percent by weight and the modified polyolefin resin (A2) constitutes 1 to 25 percent by weight in 100 percent by weight of the total of the thermoplastic resin (A1) and the modified polyolefin resin (A2), and it is more preferable that the thermoplastic resin (A1) constitutes 85 to 98 percent by weight and the modified polyolefin resin (A2) constitutes 2 to 15 percent by weight.

<Reinforcing Fibers (A3)>

The reinforcing fibers (A3) according to the present invention is not specifically limited. Examples thereof include organic fibers, e.g., carbon and nylon, and inorganic fibers, e.g., basalt and glass fibers. Preferably, glass fibers are mentioned.

Examples of glass fibers can include E glass (Electrical glass), C glass (Chemical glass), A glass (Alkali glass), S glass (High strength glass), and filament-shaped fibers produced by melt-spinning glass, e.g., alkali-resistant glass.

In the present invention, usually, glass long fibers are used. As for the material for the glass long fibers, continuous glass fiber bundle is used. This is commercially available as a glass roving. The average fiber diameter thereof is usually 3 to 30 µm, preferably 13 to 20 µm, and further preferably 16 to 18 µm. The number of filaments in a bundle is usually 400 to 10,000, preferably 1,000 to 6,000, and further preferably 3,000 to 5,000.

Alternatively, a plurality of fiber bundles can be tied and used as described in Japanese Unexamined Patent Application Publication No. 6-114830.

The fiber lengths of glass fibers in the long-fiber-reinforced thermoplastic resin particles (A) are usually 4 to 10 mm, and preferably 5 to 8 mm, and the fiber diameters are usually 10 to 20 µm, and preferably 13 to 18 µm.

The content of the reinforcing fibers (A3) is 30 to 80 percent by weight, preferably 40 to 70 percent by weight, more preferably 45 to 65 percent by weight, and particularly preferably 45 to 60 percent by weight in 100 percent by weight of the total of the thermoplastic resin (A1), the modified polyolefin resin (A2), and the reinforcing fibers (A3). If the content of the reinforcing fibers (A3) is less than 30 percent by weight, and more definitely less than 40 percent by weight, the productivity may be reduced. On the other hand, if the content of the reinforcing fibers (A3) exceeds 80 percent by weight, and more definitely 70 percent by weight, the amount of glass fibers increases, so that impregnation of the fibers is reduced and unopened glass fibers may increase.

The content of the reinforcing fibers (A3) contained in the resin particle blend (C) according to the present invention is 20 to 60 percent by weight, preferably 25 to 40 percent by weight in 100 percent by weight of the total of the long-fiber-reinforced thermoplastic resin particles (A) and the polyolefin resin particles (B) for dilution. If the content of the reinforcing fibers (A3) is less than 20 percent by weight, the strength of the resulting molded body may become insufficient. If the content of the reinforcing fibers (A3) exceeds 60 percent by weight, the appearance may become poor.

The surfaces of the reinforcing fibers (A3) can be provided with functional groups by various surface treatment methods, e.g., an electrolytic treatment and a sizing agent treatment. It is preferable that a sizing agent is used for the surface treatment, and it is particularly preferable that a sizing agent containing a coupling agent is used. In the case where the thus surface-treated reinforcing fibers are used, the adhesion to the thermoplastic resin (A1) is improved and a molded body having good strength and appearance is obtained.

Examples of sizing agents include those containing coupling agents described in Japanese Unexamined Patent Application Publication No. 2003-253563.

The coupling agent can be selected from previously known coupling agents, e.g., so-called silane based coupling agents, such as aminosilane and epoxysilane, and titanium based coupling agents.

Furthermore, sizing agents containing a resin emulsion to facilitate handling, besides the coupling agent, are also preferable.

As for the resin emulsion contained in the sizing agent, urethane based, olefin based, acryl based, nylon based, butadiene based, and epoxy based emulsions and the like can be used. Among them, urethane based and olefin based emulsions are used preferably. Here, as for the urethane based sizing agent, usually, any one of one-component types, e.g., oil-modified type, moisture-curing type, and block type, and two-component types, e.g., catalyst-curing type and polyol-curing type, can be used insofar as the agent contains polyisocyanate obtained by a polyaddition reaction between a diisocyanate compound and a polyhydric alcohol at a proportion of 50 percent by weight or more. Typical examples include VONDIC series and HYDRAN series (both produced by DIC Corporation). On the other hand, as for the olefin based sizing agent, for example, modified polyolefin based resin modified with an unsaturated carboxylic acid or a derivative thereof can be used.

<Long-Fiber-Reinforced Thermoplastic Resin Particles (A)>

The long-fiber-reinforced thermoplastic resin particles (A) including the above-described thermoplastic resin (A1), the modified polyolefin resin (A2), and the reinforcing fibers (A3) can be produced by a publicly known molding method, e.g., a drawing method. A part of the thermoplastic resin (A1), the modified polyolefin resin (A2), and the reinforcing fibers (A3) may be melt-kneaded separately and, thereafter, mixing (blending) may be performed.

The shapes of the long-fiber-reinforced thermoplastic resin particles (A) are usually columnar.

The particle lengths of the long-fiber-reinforced thermoplastic resin particles (A) are usually 4 to 10 mm, and preferably 5 to 8 mm. If the particle lengths of the long-fiber-reinforced thermoplastic resin particles (A) are less than 4 mm, effects of improving the rigidity, the heat resistance, and the impact resistance may be low, and the curvature deformation may increases. On the other hand, if the particle lengths of the long-fiber-reinforced thermoplastic resin particles (A) exceed 10 mm, molding may be difficult.

Furthermore, it is preferable that the reinforcing fibers (A3) having fiber lengths of 4 to 10 mm are aligned in almost parallel in the long-fiber-reinforced thermoplastic resin particles (A).

Regarding the long-fiber-reinforced thermoplastic resin particles (A) according to the present invention, the aspect ratio of the reinforcing fibers (A3) is large in the particles (A), so that the resin blend (C) having high strength is obtained easily.

The long-fiber-reinforced thermoplastic resin particles (A) can be obtained easily by leading a roving of the reinforcing fibers (A3) composed of several thousands of fibers to an impregnation dice, impregnating between fibers with molten thermoplastic resin (A1) and modified polyolefin resin (A2) (hereafter may be simply referred to as "molten resins") uniformly and, thereafter, performing cutting into a required length.

For example, a method in which the molten resins are fed from an extruder into an impregnation dice disposed at the end of the extruder while a continuous glass fiber bundle is passed to impregnate the glass fiber bundle with the molten resins and, thereafter, drawing is performed through a nozzle, and pelletizing into a required length is performed is employed. Alternatively, a method in which a polyolefin resin and an unsaturated carboxylic acid or an anhydride thereof are dry-blended by using an organic peroxide, are put into a hopper of an extruder, and are fed while modification is effected at the same time is employed as well.

The method for impregnation is not specifically limited. Any one of a method in which a roving is passed through a resin powder fluidized bed and, thereafter, heating to the melting point of the resin or higher is performed (Japanese Unexamined Patent Application Publication No. 46-4545), a method in which a roving of reinforcing fibers is impregnated with a molten thermoplastic resin by using a cross-head die (Japanese Unexamined Patent Application Publication No. 62-60625, Japanese Unexamined Patent Application Publication No. 63-132036, Japanese Unexamined Patent Application Publication No. 63-264326, and Japanese Unexamined Patent Application Publication No. 1-208118), a method in which resin fibers and a roving of reinforcing fibers are woven together and, thereafter, heating to the melting point of the resin or higher is performed to effect impregnation with the resin (Japanese Unexamined Patent Application Publication No. 61-118235), a method in which a plurality of rods are disposed in the inside of a die, a roving is wrapped around them in a zigzag manner to open fibers and effect impregnation with the molten resins (Japanese Unexamined Patent Application Publication No. 10-264152), and a method in which passing between a pair of fiber opening pins without contacting the pins is performed (International Publication No. 97/19805), and the like can be employed.

Alternatively, in a process for melting a resin, an extruder having at least two feed portions may be used, a decomposition agent may be put in from a top feed, and another resin may be put in from a side feed. At this time, in the case of, for example, a polypropylene based resin, an organic peroxide is preferable as the decomposition agent.

Alternatively, at least two extruders (extrusion portions) may be used, and a decomposition agent may be put into at least one of them.

Furthermore, a resin, un unsaturated carboxylic acid or a derivative thereof, and a decomposition agent may be put into at least one place of an extruder.

Regarding the long-fiber-reinforced thermoplastic resin particles (A) obtained as described above, when 25 g of the long-fiber-reinforced thermoplastic resin particles (A) are encapsulated in a 20-L SUS chamber and are stood at 65° C. for 1 hour, the amount of acetaldehyde dissipated from the particles (A) concerned is 3.0 μg/m$^3$ or less, preferably 2.8 μg/m$^3$ or less, and more preferably 2.7 μg/m$^3$ or less.

As described above, the thermoplastic resin (A1) according to the present invention has a narrow molecular weight distribution (Mw/Mn) due to characteristics of the metallocene catalyst used in the production and, therefore, decomposition of the thermoplastic resin (A1) through addition of a peroxide is not necessary prior to production of the long-fiber-reinforced thermoplastic resin particles (A). The amount of acetaldehyde dissipated from the particles (A) is small because volatile low-molecular weight components in association with decomposition due to the peroxide are not generated.

Therefore, in the present invention, an operation to remove volatile components (VOC and the like) generated in association with decomposition of the thermoplastic resin (A1) is unnecessary, so that the long-fiber-reinforced thermoplastic resin particles (A) can be produced efficiently.

In this regard, the thermoplastic resin described in Japanese Patent Application No. 2008-074405 is produced by using a Ziegler based catalyst, so that the molecular weight distribution (Mw/Mn) is wide and much low-molecular weight components are contained. Consequently, decomposition through addition of a peroxide is necessary prior to production of the long-fiber-reinforced thermoplastic resin particles (A). Therefore, in the case where 25 g of pellets formed from the thermoplastic resin produced by using the Ziegler based catalyst are analyzed, the amount of acetaldehyde results in 6.7 μg/m$^3$ and the amount of dissipation of aldehyde is obviously larger than that of the long-fiber-reinforced thermoplastic resin particles (A) according to the present invention.

The content of the long-fiber-reinforced thermoplastic resin particles (A) according to the present invention is 10 to 90 percent by weight, preferably 50 to 90 percent by weight, and more preferably 50 to 80 percent by weight in 100 percent by weight of the total of the long-fiber-reinforced thermoplastic resin particles (A) and the polyolefin resin particles (B) for dilution.

[Polyolefin Resin Particles (B) for Dilution]

As for the polyolefin resin particles (B) for dilution according to the present invention, for example, polyethylene based resins, polypropylene based resins, and the like can be used. More specific examples of polyethylene based resins include low-density polyethylene (LDPE) and ethylene-α-olefin copolymers and examples of polypropylene based resins include propylene homopolymers, propylene-α-olefin random copolymers, and propylene-α-olefin block copolymers. Among them, polypropylene based resins are mentioned as particularly preferable resins.

As for the method for manufacturing the polyolefin resin particles (B) for dilution, publicly known manufacturing methods by using a metallocene catalyst, a Ziegler based catalyst, or the like can be employed with no limitation. For example, manufacturing methods described in Japanese Unexamined Patent Application Publication No. 11-071431, Japanese Unexamined Patent Application Publication No. 2002-234976, Japanese Unexamined Patent Application Publication No. 2002-249624, International Publication No. 01/27124 described above, Japanese Unexamined Patent Application Publication No. 11-315109 described above, and the like can be employed.

The melt index (MI; resin temperature 230° C., load 21.18 N) of the polyolefin resin particles (B) for dilution is preferably 20 to 70 g/10 min, as in the item (b-1), and more preferably 20 to 60 g/10 min. In the case where the melt index of the polyolefin resin particles (B) for dilution is within the above-described range, the viscosity of the resin blend (C) can be maintained at a high level and the shear stress can be increased during injection molding of the resin blend (C). If the melt index of the polyolefin resin particles (B) for dilution is less than 20 g/10 min, the fluidity of the resin blend (C) may be reduced and mold transfer may be reduced. On the other hand, if the melt index of the polyolefin resin particles (B) for dilution exceeds 70 g/10 min, fiber unopening of glass fibers may increase.

In this regard, the method for controlling the melt index of the polyolefin resin particles (B) for dilution within the above-described range is as described above with respect to the long-fiber-reinforced thermoplastic resin particles (A).

The relaxation time $\lambda=G'\div(G''\times\omega)$, that is, $G'\div G''$, is preferably 0.3 seconds or shorter, where the angular frequency $\omega=1$ (rad/sec), which is calculated from the storage modulus G' and the loss modulus G" measured with a cone & plate rheometer (relaxation time $\lambda \leq 0.3$ sec), as in the item (b-2). If the relaxation time $\lambda$ exceeds 0.3 sec, fiber unopening of glass fibers (A3) may increase or, for example, molding of a large scale molded body for automobile may become difficult.

The relaxation time $\lambda$ of the polyolefin resin particles (B) for dilution is more preferably 0.01 to 0.3 sec, and particularly preferably 0.05 to 0.28 sec. The relaxation time $\lambda$ of 0.3 sec or shorter is favorable because the fluidity and the properties are kept in balance.

The relaxation time $\lambda$ will be described below.

Regarding a material system which has reached a new equilibrium state or steady state from an original equilibrium state by application of an external force, a relaxation phenomenon refers to a phenomenon in which when the external force is removed, the system returns to the original equilibrium state on the basis of an internal motion of the system. The specific time constant serving as a guidepost of the time required for relaxation is referred to as a relaxation time. In the case where a polymer is molded, a molten polymer is allowed to flow. At this time, the molecular chain is drawn in the flow direction and is aligned (this is referred to as "orient"). However, when the drawing is finished, the flowing is stopped, and cooling is started, the stress applied to the molecule is removed, and each molecular chain begins to move and points an arbitrary direction in the end (this is referred to as "relaxation of molecular chain").

This relaxation time $\lambda$ can be represented by $$\lambda = G'/\omega G'' = G'/G'',$$

where the angular frequency $\omega=100°=1$ (rad/sec).

Here, G' represents a storage modulus showing an elastic property of the polyolefin resin, and G" represents a loss modulus showing a viscous property of the polyolefin resin. As is clear from this formula, a long (large) relaxation time $\lambda$ indicates that G' is large, and there are much components exhibiting an elastic property in the polyolefin resin. On the other hand, a short (small) relaxation time $\lambda$ indicates that G" is large and indicates that there are much components exhibiting a viscous property in the polyolefin resin, that is, the molecular weight of the resin is small and the molecular weight distribution is narrow.

As for the method for controlling the relaxation time, the following methods are mentioned.

(1) The molecular weight distribution is changed through decomposition with a peroxide or the like (in particular, resins having small $\lambda$ are obtained easily from a high molecular weight material through decomposition under high magnification).

(2) A plurality of resins having different molecular weight distributions are mixed (it is effective to produce resins having narrow molecular weight distributions by a method in which, for example, the degree of decomposition is increased by using a high-activity catalyst or using large amounts of peroxide and combine the resins).

(3) In multistage polymerization, individual polymerization conditions are adjusted (however, it may be industrially disadvantageous from the viewpoint of the cost).

(4) Selection of polymerization catalyst

The molecular weight distribution (Mw/Mn) in terms of standard polypropylene measured by gel permeation chromatography (GPC) of the polyolefin resin particles (B) for dilution is preferably 2.5 to 6.0, as in the item (b-3), more preferably 3.0 to 5.5, and particularly preferably 3.5 to 5.5. The molecular weight (Mn) is usually $1 \times 10^4$ to $12 \times 10^4$, preferably $2 \times 10^4$ to $10 \times 10^4$, and more preferably $3 \times 10^4$ to $8 \times 10^4$. The number average molecular weight (Mn) within the above-described range is favorable from the viewpoint of ensuring compatibility between an operating ease in fiber impregnation step and mechanical strength.

The content of the polyolefin resin particles (B) for dilution according to the present invention is 10 to 90 percent by weight, preferably 10 to 50 percent by weight, and more preferably 20 to 50 percent by weight in 100 percent by weight of the total of the long-fiber-reinforced thermoplastic resin particles (A) and the polyolefin resin particles (B) for dilution.

[Long-Fiber-Reinforced Thermoplastic Resin Particle Blend (C)]

The resin blend (C) according to the present invention is formed from the long-fiber-reinforced thermoplastic resin particles (A) and the polyolefin resin particles (B) for dilution. That is, the resin blend (C) according to the present invention is a dry blend material obtained by physically dry-blending the long-fiber-reinforced thermoplastic resin particles (A) and the polyolefin resin particles (B) for dilution substantially. Here, the term "substantially" refers to that the resin blend (C) according to the present invention may contain the following additives in addition to the long-fiber-reinforced thermoplastic resin particles (A) and the polyolefin resin particles (B) for dilution.

That is, additives, for example, reforming additives, e.g., a dispersing agent, a lubricant, a plasticizer, a flame retardant, an antioxidant (phenol based antioxidant, phosphorus based antioxidant, and sulfur based antioxidant), an antistatic agent, a copper inhibitor, a light stabilizer, an ultraviolet absorber, a crystallization promoter (nucleating agent), a foaming agent, a cross-linking agent, and an antimicrobial agent, coloring agents, e.g., pigments and dyes, granular fillers, e.g., carbon black, titanium oxide, red iron oxide, azo pigments, anthraquinone pigments, phthalocyanine, talc, calcium carbonate, mica, and clay, short-fiber shaped fillers, e.g., Wollastonite, and whiskers, e.g., potassium titanate, may be contained.

These additives may be added in production of the long-fiber-reinforced thermoplastic resin particles (A), so as to be contained in the long-fiber-reinforced thermoplastic resin particles (A), or be added in production of a molded body.

The resin blend (C) according to the present invention is obtained by various publicly known methods, for example, by performing dry-blending with a V-type blender, a ribbon blender, a Henschel mixer, a tumbler mixer, or the like. The production condition can be adjusted appropriately in accordance with, for example, the type of the material used. It is desirable that, preferably, the long-fiber-reinforced thermoplastic resin particles (A) and the polyolefin resin particles (B) for dilution are put into a tumbler blender and dry-blended within 3 minutes under the condition of 50° C. or lower.

Regarding the resin blend (C) according to the present invention, it is desirable that the long-fiber-reinforced thermoplastic resin particles (A) are X g, the polyolefin resin particles (B) for dilution are 50-X g, and the standard deviation (1σ) is within the range of usually 4.5 or less, preferably 3.5 or less, and more preferably 3.0 or less on an average value basis when five samples in an amount of 50 g are taken at random from the dry blend material obtained as described above and individual weights are measured. The standard deviation within the above-described range is favorable because the resin blend (C) according to the present invention is dispersed uniformly.

As described above, the resin blend (C) according to the present invention is the dry blend material formed form the long-fiber-reinforced thermoplastic resin particles (A) and the polyolefin resin particles (B) for dilution. In the case where the resin blend (C) is not passed through an extruder, but is fed directly to a molding machine, e.g., an injection molding machine, the fiber length of reinforcing fibers (A3) in the resin blend (C) is maintained and higher effects of improving the rigidity, the impact resistance, and the durability can be obtained. In this regard, it is preferable that 5 to 60 percent by weight of reinforcing fibers (A3) are contained in 100 percent by weight of the total of the long-fiber-reinforced thermoplastic resin particles (A) and the polyolefin resin particles (B) for dilution, and it is more preferable that 10 to 50 percent by weight of reinforcing fibers (A3) are contained.

[Molded Body]

Various molded bodies can be produced by molding the long-fiber-reinforced thermoplastic resin particles (A) or the resin blend (C) according to the present invention.

As for the molding method, publicly known molding methods, e.g., an injection molding method, an extrusion method, a blow molding method, a compression molding method, an injection compression molding method, a gas-assisted injection molding, and a foam injection molding, can be employed without limitation. Most of all, the injection molding method, the compression molding method, and the injection compression molding method are preferable, and in particular, the injection molding method is preferable.

The resin blend (C) according to the present invention is produced by preparing the long-fiber-reinforced thermoplastic resin particles (A) in advance and performing dry blending of the long-fiber-reinforced thermoplastic resin particles (A) and the polyolefin resin particles (B) for dilution in contrast to PTLs 3 and 4 described above, in which a single type of pellets are produced by using the long-fiber-reinforced resin composition prepared through melt-kneading of two types of propylene polymers and the reinforcing fibers. If the long-fiber-reinforced thermoplastic resin particles (A) are not prepared, but all the thermoplastic resin (A1), the modified polyolefin resin (A2), the reinforcing fibers (A3), and the polyolefin resin particles (B) for dilution are melt-kneaded in one operation, the dispersibility of the reinforcing fibers (A3) in the resulting molded body is poor. In the resin blend (C) according to the present invention, uniformized long-fiber-reinforced thermoplastic resin particles (A) and polyolefin resin particles (B) for dilution are contained, and the dispersibility of the reinforcing fibers (A3) is good. In production of the long-fiber-reinforced thermoplastic resin particles (A) according to the present invention, the thermoplastic resin (A1) having a high melt index (MI) and a narrow molecular weight distribution (Mw/Mn) is used and performs a function of improving the dispersibility of the reinforcing fibers (A3) in the particles (A), or the polyolefin having a low melt index (MI) and a relatively wide molecular weight distribution (Mw/Mn) is used as the polyolefin resin particles (B) for dilution and performs the function of maintaining the viscosity of the resin blend (C) in an injection cylinder at a high level to increase a shear stress during injection molding.

Consequently, the molded body obtained by injection-molding the resin blend (C) according to the present invention exhibits excellent appearance because the reinforcing fibers (A3) are opened sufficiently. Furthermore, the fiber length of the reinforcing fibers (A3) is kept over a long period and, thereby, properties higher than or equivalent to those of the conventional product can be maintained.

EXAMPLES

The present invention will be more specifically described below with reference to the examples. However, the present invention is not limited to these examples.

Various parameters in Tables were measured by the following methods.

[Melt Index (MI)]

The measurement was performed on the basis of JIS K 7210-1999 under the condition of a resin temperature of 230° C. and a load of 21.18 N.

[Amount of Components Soluble into o-dichlorobenzene at 90° C.]

The measurement was performed by using a cross fractionation chromatograph (CFC).

The analysis of components soluble into o-dichlorobenzene at each temperature was performed by using a cross fractionation chromatograph (CFC). The CFC measurement was performed by using the following apparatus provided with a temperature rising elution fractionation (TREF) section to perform composition fractionation and a GPC section to perform molecular weight fractionation under the following condition, and the amounts at individual temperatures were calculated.

Measurement apparatus: Model CFC T-150A, produced by Mitsubishi Petrochemical Co., Ltd.,
  Column: Shodex AT-806MS (×3 units)
  Dissolution liquid: o-dichlorobenzene
  Flow rate: 1.0 ml/min
  Sample concentration: 0.3 wt %/vol % (containing 0.1% BHT)
  Amount of injection: 0.5 ml
  Solubility: complete dissolution
  Detector: infrared absorption spectrometry, 3.42μ (2924 cm$^{-1}$), NaCl plate
  Elution temperature: 0° C. to 135° C., 28 fractions
  0, 10, 20, 30, 40, 45, 50, 55, 60, 65, 70, 75, 80, 85, 90, 94, 97, 100, 103, 106, 109, 112, 115, 118, 121, 124, 127, 135 (° C.)

Regarding detailed measurement, a sample was dissolved by heating at 145° C. for 2 hours and was kept at 135° C. Thereafter, the temperature was lowered to 0° C. at 10° C./hour, followed by keeping at 0° C. for 60 minutes, so that coating with the sample was effected. The volume of the temperature rising elution column was 0.83 ml, and the volume of the pipe was 0.07 ml. As for the detector, an infrared spectrometer Model MIRAN 1A CVF (CaF$_2$ cell) produced by FOXBORO was used and infrared light of 3.42μ (2924 cm$^{-1}$) was detected under the setting of an absorbance mode with a response time of 10 seconds. Regarding the elution temperature, 0° C. to 135° C. was divided into 28 fractions. All temperature are indicated in integers. For example, an elution fraction of 94° C. refers to components eluted at 91° C. to 94° C. The molecular weights of components not applied as a coating even at 0° C. and fractions eluted at individual temperatures were measured and molecular weights in terms of polypropylene were determined by using a universal calibration curve. The SEC temperature was 135° C., the amount of injection of an internal standard was 0.5 ml, the position of injection was 3.0 ml, and the data sampling time was 0.50 seconds. Data processing was performed with the analysis program "CFC Data Processing (version 1.50)" attached to the apparatus.

[Number Average Molecular Weight (Mn), Weight Average Molecular Weight (Mw), and Molecular Weight Distribution (Mw/Mn)]

The measurement was performed by using a gel permeation chromatograph (GPC).

Regarding the measurement of the molecular weight and the molecular weight distribution, GPC-150C Plus produced by Waters Corporation was used and the measurement was performed as described below. The separation columns were TSKgel GMH6-HT and TSK gel GMH6-HTL and each column size was an inside diameter of 7.5 mm and a length of 600 mm, the column temperature was specified to be 140° C., o-dichlorobenzene (Wako Pure Chemical Industries, Ltd.) was used as a mobile phase, and 0.025 percent by weight of BHT (Wako Pure Chemical Industries, Ltd.) was used as the antioxidant. Movement was performed at 1.0 ml/min, the sample concentration was specified to be 0.1 percent by weight, the amount of injection of the sample was specified to be 500 μL, and a differential refractometer was used as the detector. The standard polystyrene produced by Tosoh Corporation was used where the molecular weight Mw<1,000 and Mw>4×10$^6$, the standard polystyrene produced by Pressure Chemical Company was used where 1,000≦Mw≦4×10$^6$, and conversion to PP was performed by using a universal calibration method. In this regard, as for the Mark-Houwink coefficients of PS and PP, the values described in literatures (J. Polym. Sci., Part A-2, 8, 1803 (1970) and Makromol. Chem., 177, 213 (1976), respectively) were used.

[Measurement of Amount of VOC (Acetaldehyde)]

The measuring method is as described below.
(i) A 20-L SUS chamber is brought into a hermetically sealed state and is heated to a temperature of 65° C.
(ii) After 1 hour, the chamber blank is taken.
(iii) After the chamber is returned to room temperature, the long-fiber-reinforced thermoplastic resin particles (A) are put in and purging with clean air is performed.
(iv) The chamber is returned to the hermetically sealed state, and is heated to 65° C. again.
(v) After standing in the hermetically sealed state for 1 hour, and air containing gases dissipated from the long-fiber-reinforced thermoplastic resin particles (A) is taken for 50 minutes at a sampling flow rate of 200 mL/min while clean air is introduced again.

As for the absorbing agent, 2,4-DNPH cartridge was used.
(vi) 10 L of sampled gas is dissolved into a solvent, and aldehydes contained in the dissipated gas were analyzed by high performance liquid chromatography (HPLC).

In this regard, formaldehyde was also detected in association with aldehyde, but the amount of formaldehyde contained in the dissipated gas taken from 25 g of long-fiber-reinforced thermoplastic resin particles (A) was less than 2 μg/m$^3$.

[Melting Point (Tm)]

The measurement was performed by using a differential scanning calorimeter (DSC, produced by PerkinElmer, Inc.). Here, the endothermic peak at the third step was defined as the melting point (Tm).

(Sample Preparation Condition)
Molding method: Press molding
Mold: thickness 0.2 mm (a sample is sandwiched between aluminum foil and is press-molded by using a mold)
Molding temperature: 240° C. (heating temperature 240° C.)
Press pressure: 300 kg/cm$^2$, press time: 1 minute
After the press molding, the sheet is cooled with ice water and about 0.4 g of sheet is encapsulated in the following container
Measurement container: DSC PANS 10 μl BO-14-3015
  DSC COVER B014-3003
(Measurement Condition)
First step: temperature is raised to 240° C. at 10° C./min and is kept for 10 minutes.
Second step: temperature is lowered to 30° C. at 10° C./min.
Third step: temperature is raised to 240° C. at 10° C./min.

[Storage Modulus (G'), Loss Modulus (G"), and Relaxation time (λ)]
(Sample Preparation Condition)
Molding method: press molding
Sample size: thickness: 1 mm, diameter: 2.8 mm
Molding condition:
  Preheating: mold 200° C., 120 seconds while no pressure is applied Degasification: mold 200° C., pressurization 0 to 30 kg/cm² →releasing is repeated about 10 times as quick as possible Pressurization: 60 seconds at a pressure of 80 kg/cm²

Cooling: cooling mold 30° C., 120 seconds at a pressure of 80 kg/cm²

The measurement was performed under the following condition by using a cone & plate rheometer.

Measuring apparatus: system-4 (trade name) produced by Rheometrics

Shape of measurement section: cone & plate type

Measurement condition: 175° C., strain 30% (sine strain)

The storage modulus G' and the loss modulus G" were determined under the above-described condition, and the relaxation time λ (sec), where an angular frequency (of sine strain applied to a circular plate) ω=1 (rad/sec), was determined by calculating λ=G'÷(G"×ω)=G'÷G".

By the way, the measurement with the cone & plate rheometer is described in, for example, "SEIKEI KAKOU", 1989, Vol. 1, No. 4, p. 355, and Japanese Unexamined Patent Application Publication No. 2003-226791.

[Bending Test]

Test machine: Bend tester AGS-10KND produced by SHIMADZU CORPORATION

Test piece size: L×W×t=120×10×4 (mm)

Test condition: temperature 23° C., span 80 mm, test speed 2 mm/min

[Vibration Fatigue Characteristic]

A test piece having a width of 1.01 cm and a thickness of 0.27 cm was cut from the molded body obtained from the resin blend (C) according to the present invention, and a vibration fatigue test was performed under the condition of the frequency of 15 Hz and the temperatures of 23° C. and 90° C. with respect to the machine direction (MD) and the transverse direction (TD) of the test piece. The vibration test was performed under each stress condition, and the vibration fatigability was evaluated on the basis of the number of vibrations when the test piece was broken.

Production Example 1

Production of Thermoplastic Resin (A1) (mPP-1)

(1) Production of Solid Catalyst Carrier

After 300 g of $SiO_2$ was sampled into a 1-L side-arm flask, 800 mL of toluene was put in, and a slurry was produced. Subsequently, the liquid was transferred to a 5-L four-necked flask, and 260 mL of toluene was added. Then, 2,830 mL of methylaluminoxane (hereafter may be referred to as "MAO")-toluene solution (10 percent by weight solution) was introduced. Agitation was performed for 30 minutes while the temperature was kept at room temperature. The temperature was raised to 110° C. over 1 hour, a reaction was effected for 4 hours. After the reaction was completed, cooling was performed to room temperature. After the cooling, a supernatant toluene was drawn, and substitution with fresh toluene was performed until the substitutional rate reached 95%.

(2) Production of Solid Catalyst (Supporting of Metal Catalyst Component by Carrier)

In a glove box, 2.0 g of [3-(1',1',4',4',7',7',10',10'-octamethyloctahydrodibenzo[b,h]fluorenyl)(1,1,3-trimethyl-5-t-butyl-1,2,3,3a-tetrahydropentalene)]zirconium dichloride was weighed into a 5-L four-necked flask. The flask was taken out, 0.46 liters of toluene and 1.4 liters of $MAO/SiO_2$/toluene slurry prepared in the item (1) were added in nitrogen, and agitation was performed for 30 minutes to effect supporting. The resulting [3-(1',1',4',4',7',7',10',10'-octamethyloctahydrodibenzo[b,h]fluorenyl)(1,1,3-trimethyl-5-t-butyl-1,2,3,3a-tetrahydropentalene)]zirconium dichloride/MAO/$SiO_2$/toluene slurry was subjected to 99% substitution with n-heptane, so that the amount of final slurry was specified to be 4.5 liters. This operation was performed at room temperature.

(3) Production of Prepolymerization Catalyst

An autoclave having an internal volume of 200 L provided with an agitator was charged with 404 g of solid catalyst component prepared in the above-described item (2), 218 mL of triethylaluminum, and 100 L of heptane, the internal temperature was kept at 15° C. to 20° C., 1,212 g of ethylene was put in, and a reaction was effected for 180 minutes while agitation was performed. After the polymerization was completed, a solid component was settled, and removal of a supernatant and washing with heptane were performed two times. The resulting prepolymerization catalyst was suspended again in refined heptane, and adjustment with heptane was performed in such a way that the solid catalyst concentration became 4 g/L. The resulting prepolymerization catalyst contained 3 g of polyethylene in 1 g of solid catalyst component.

(4) Polymerization

A circulation type tubular polymerization device having an internal volume of 58 L provided with a jacket was continuously supplied with 40 kg/hour of propylene, 5 NL/hour of hydrogen, 0.8 g/hour, in terms of solid catalyst component, of the catalyst slurry produced in the item (3), and 4 ml/hour of triethylaluminum, and polymerization was effected in a full liquid state, where no gas phase was present. The temperature of the tubular reactor was 30° C., and the pressure was 3.2 MPa/G.

The resulting slurry was transferred to a vessel polymerization device having an internal volume of 1,000 L provided with an agitator and the polymerization was further effected. The polymerization device was supplied with 45 kg/hour of propylene and hydrogen in such a way that the hydrogen concentration in the gas phase portion became 0.25 percent by mole. The polymerization was effected at a polymerization temperature of 72° C. and a pressure of 3.1 MPa/G.

The resulting slurry was transferred to a vessel polymerization device having an internal volume of 500 L provided with an agitator and the polymerization was further effected. The polymerization device was supplied with 10 kg/hour of propylene and hydrogen in such a way that the hydrogen concentration in the gas phase portion became 0.25 percent by mole. The polymerization was effected at a polymerization temperature of 71° C. and a pressure of 3.0 MPa/G.

The resulting slurry was vaporized and, thereafter, gas solid separation was performed, so that a polypropylene homopolymer was obtained. The resulting polypropylene homopolymer was vacuum-dried at 80° C.

Regarding the resulting polypropylene homopolymer, the number average molecular weight (Mn) was 42,000, the weight average molecular weight (Mw) was 93,000, the molecular weight distribution (Mw/Mn) was 2.2, the melt index (MI) was 165 g/10 min, the amount of elution at 90° C. or lower was 0.2 percent by weight, and the melting point (Tm) was 156° C.

The results are shown in Table 1.

Production Example 2

Production of Thermoplastic Resin (A1) (mPP-2)

A thermoplastic resin (mPP-2) was produced in a manner similar to that in Production example 1 except that the polymerization in Production example 1 was changed to the following method.

(1) Polymerization

A circulation type tubular polymerization device having an internal volume of 58 L provided with a jacket was continuously supplied with 40 kg/hour of propylene, 5 NL/hour of hydrogen, 1.0 g/hour, in terms of solid catalyst component, of the catalyst slurry produced in the item (3) in Production example 1, and 4 ml/hour of triethylaluminum, and polymerization was effected in a full liquid state, where no gas phase was present. The temperature of the tubular reactor was 30° C., and the pressure was 3.2 MPa/G.

The resulting slurry was transferred to a vessel polymerization device having an internal volume of 1,000 L provided with an agitator and the polymerization was further effected. The polymerization device was supplied with 45 kg/hour of propylene and hydrogen in such a way that the hydrogen concentration in the gas phase portion became 0.24 percent by mole. The polymerization was effected at a polymerization temperature of 72° C. and a pressure of 3.1 MPa/G.

The resulting slurry was transferred to a vessel polymerization device having an internal volume of 500 L provided with an agitator and the polymerization was further effected. The polymerization device was supplied with 10 kg/hour of propylene and hydrogen in such a way that the hydrogen concentration in the gas phase portion became 0.24 percent by mole. The polymerization was effected at a polymerization temperature of 71° C. and a pressure of 3.0 MPa/G.

The resulting slurry was vaporized and, thereafter, gas solid separation was performed, so that a polypropylene homopolymer was obtained. The resulting polypropylene homopolymer was vacuum-dried at 80° C.

Regarding the resulting polypropylene homopolymer, the number average molecular weight (Mn) was 45,000, the weight average molecular weight (Mw) was 104,000, the molecular weight distribution (Mw/Mn) was 2.3, the melt index (MI) was 115 g/10 min, the amount of elution at 90° C. or lower was 0.1 percent by weight, and the melting point (Tm) was 156° C.

The results are shown in Table 1.

Production Example 3

Production of Thermoplastic Resin (mPP-3)

The following method was employed by using the solid catalyst carrier produced in the item (1) in Production example 1.

(1) Production of Solid Catalyst (Supporting of Metal Catalyst Component by Carrier)

In a glove box, 2.0 g of diphenylmethylene(3-t-butyl-5-methylcyclopentadienyl)(2,7-t-butylfluorenyl)zirconium dichloride was weighed into a 5-L four-necked flask. The flask was taken out, 0.46 liters of toluene and 1.4 liters of MAO/SiO$_2$/toluene slurry prepared in the item (1) in Production example 1 were added in nitrogen, and agitation was performed for 30 minutes to effect supporting. The resulting diphenylmethylene(3-t-butyl-5-methylcyclopentadienyl)(2,7-t-butylfluorenyl)zirconium dichloride/MAO/SiO$_2$/toluene slurry was subjected to 99% substitution with n-heptane, so that the amount of final slurry was specified to be 4.5 liters. This operation was performed at room temperature.

(2) Production of Prepolymerization Catalyst

An autoclave having an internal volume of 200 L provided with an agitator was charged with 404 g of solid catalyst component prepared in the above-described item (1), 218 mL of triethylaluminum, and 100 L of heptane, the internal temperature was kept at 15° C. to 20° C., 606 g of ethylene was put in, and a reaction was effected for 180 minutes while agitation was performed. After the polymerization was completed, a solid component was settled, and removal of a supernatant and washing with heptane were performed two times. The resulting prepolymerization catalyst was suspended again in refined heptane, and adjustment with heptane was performed in such a way that the solid catalyst concentration became 4 g/L. The resulting prepolymerization catalyst contained 3 g of polyethylene in 1 g of solid catalyst component.

(3) Polymerization

A tubular polymerization device having an internal volume of 58 L was continuously supplied with 40 kg/hour of propylene, 5 NL/hour of hydrogen, 1.7 g/hour, in terms of solid catalyst component, of the catalyst slurry produced in the item (2) in Production example 3, and 4 ml/hour of triethylaluminum, and polymerization was effected in a full liquid state, where no gas phase was present. The temperature of the tubular reactor was 30° C., and the pressure was 3.2 MPa/G.

The resulting slurry was transferred to a vessel polymerization device having an internal volume of 1,000 L provided with an agitator and the polymerization was further effected. The polymerization device was supplied with 45 kg/hour of propylene and hydrogen in such a way that the hydrogen concentration in the gas phase portion became 0.20 percent by mole. The polymerization was effected at a polymerization temperature of 72° C. and a pressure of 3.1 MPa/G.

The resulting slurry was transferred to a vessel polymerization device having an internal volume of 500 L provided with an agitator and the polymerization was further effected. The polymerization device was supplied with 10 kg/hour of propylene and hydrogen in such a way that the hydrogen concentration in the gas phase portion became 0.20 percent by mole. The polymerization was effected at a polymerization temperature of 71° C. and a pressure of 3.0 MPa/G.

The resulting slurry was transferred to a vessel polymerization device having an internal volume of 500 L provided with an agitator and the polymerization was further effected. The polymerization device was supplied with 10 kg/hour of propylene and hydrogen in such a way that the hydrogen concentration in the gas phase portion became 0.20 percent by mole. The polymerization was effected at a polymerization temperature of 69° C. and a pressure of 3.0 MPa/G.

Regarding the resulting polypropylene homopolymer (mPP-3), the number average molecular weight (Mn) was 41,000, the weight average molecular weight (Mw) was 94,000, the molecular weight distribution (Mw/Mn) was 2.3, the melt index (MI) was 165 g/10 min, the amount of components soluble into o-dichlorobenzene at 90° C. was 6 percent by weight, and the melting point (Tm) was 147° C.

Example 1

Figure 1:
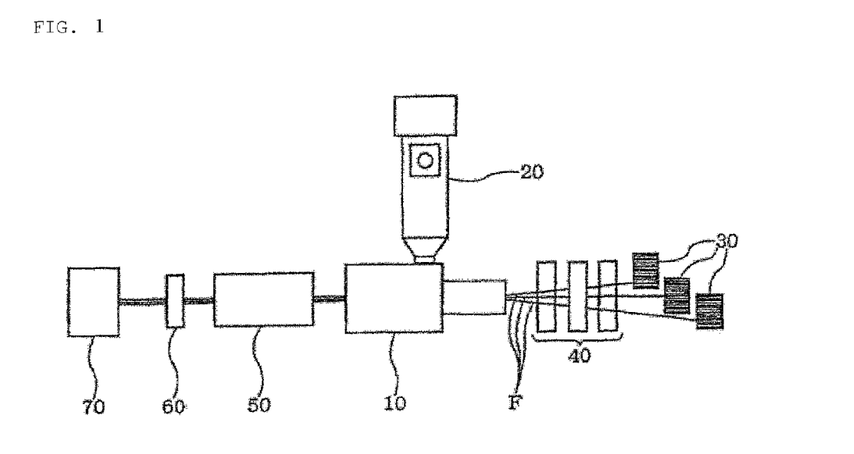
FIG. 1 is a schematic diagram of a pellet manufacturing apparatus.
Figure 2:
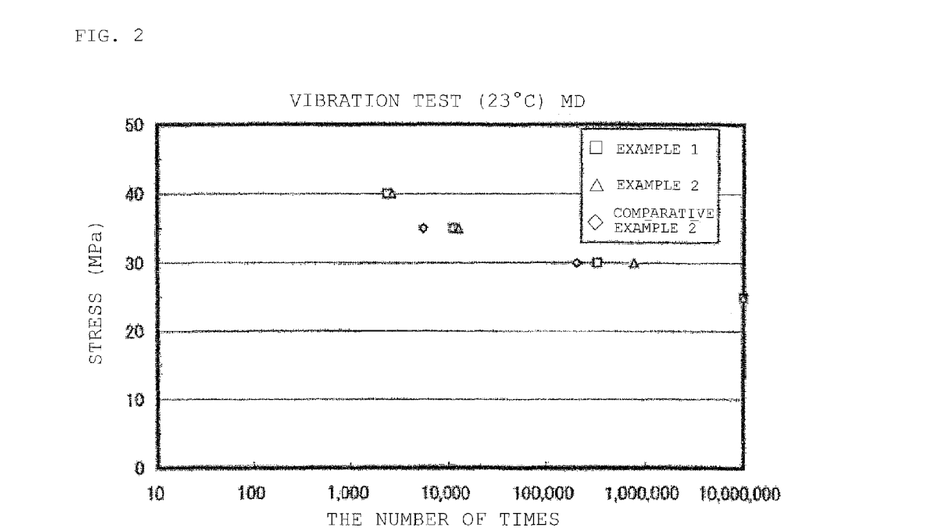
FIG. 2 is a diagram showing a plot of the results, where a vibration test was performed at 23° C. in the MD direction.
Figure 3:
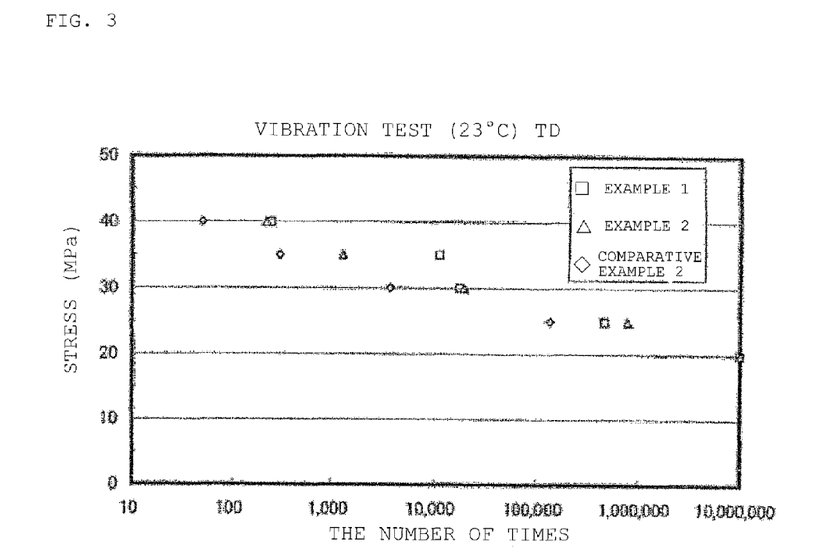
FIG. 3 is a diagram showing a plot of the results, where a vibration test was performed at 23° C. in the TD direction.
Figure 4:
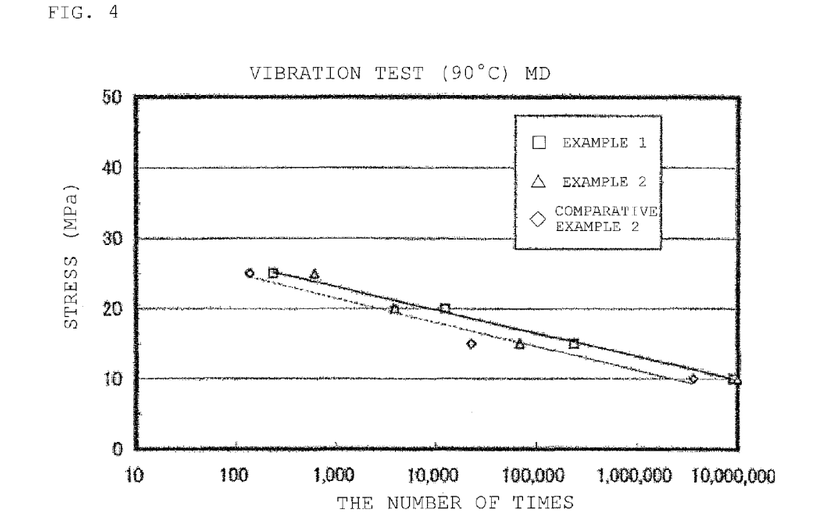
FIG. 4 is a diagram showing a plot of the results, where a vibration test was performed at 90° C. in the MD direction.
Figure 5:
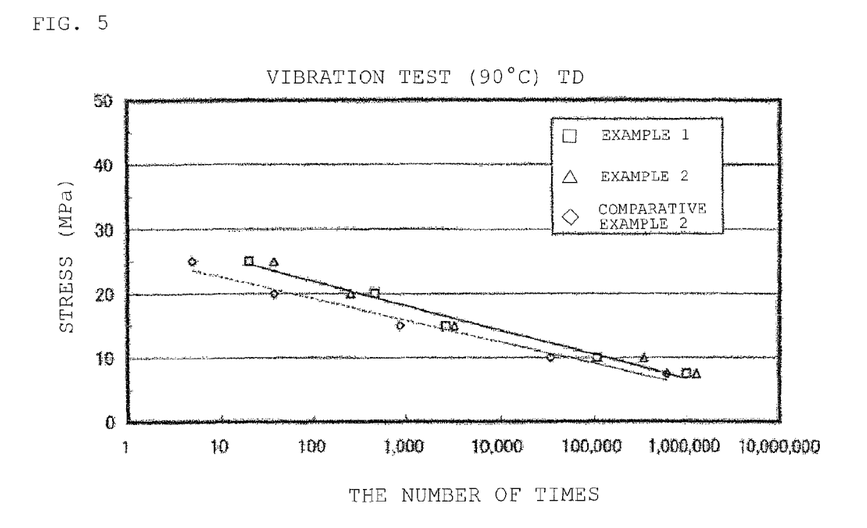
FIG. 5 is a diagram showing a plot of the results, where a vibration test was performed at 90° C. in the TD direction.

Long-fiber-reinforced thermoplastic resin particles (A) were produced by using the pellet manufacturing apparatus shown in FIG. 1.

In this regard, in FIG. 1, reference numeral 10 denotes a die, reference numeral 20 denotes an extruder to supply a molten resin to the die 10, reference numeral 30 denotes a roll of a fiber bundle F, reference numeral 40 denotes a tension roll group to give constant tension to the fiber bundle F pulled into the die 10, reference numeral 50 denotes a cooling device to cool a molten resin-impregnated fiber bundle pulled out of the die 10, reference numeral 60 denotes a pull-out roll of the fiber bundle, and reference numeral 70 denotes a pelletizer to cut the pulled out molten resin-impregnated fiber bundle to produce long-fiber-reinforced thermoplastic resin particles (A). In this apparatus, three fiber bundles F independent of each other are impregnated with the molten resin at the same time.

The specific production condition is as described below.

Die: attachment to the end of a 50-mm diameter extruder while four rods are disposed in an impregnation portion linearly Fiber bundle: a glass roving in which 4,000 glass fibers (A3) having a fiber diameter of 16 μm and having been surface-treated with aminosilane are bundled Preheating temperature: 200° C.

Thermoplastic resin (A1) and modified polyolefin resin (A2): mPP-1 (propylene homopolymer) and PP-2 (maleic anhydride-modified polypropylene, the amount of addition of maleic anhydride 2 percent by weight, H-1100P, produced by Prime Polymer Co., Ltd.) shown in Table 1 are blended on the basis of the composition ratio shown in Table 2 and are melted Melting temperature: 280° C.

Rod: four rods of 6 mm (diameter)×3 mm (length)

Inclination angle: 25 degrees

Under the above-described condition, the fiber bundles were fed into the die with the tension roll group while the amount was adjusted, so as to be impregnated. Thereafter, the fibers were pulled out of the die and were cooled. Then, long-fiber-reinforced thermoplastic resin particles (A) having a particle length of 6 mm were prepared with the pelletizer.

The resulting particles (A) were dry-blended with PP-3 (propylene homopolymer, polyolefin resin particles (B) for dilution) at the blend ratio shown in Table 2 in such a way that the content of the glass fibers (A3) in the resulting resin blend (C) became 40 percent by weight and, thereby, the resin blend (C) was prepared.

Subsequently, test pieces of the long-fiber-reinforced thermoplastic resin particles (A) and the resin blend (C) were produced under the following condition, and tests of bending strength [MPa] and bending modulus of elasticity [MPa] were performed.

Injection molding machine: FANUC α100B (full-flighted screw)

Mold: ISO-compatible tensile dumbbell (family mold of 2 units)

Molding temperature: 250° C./45° C.

The results are shown in Table 2.

Then, the resulting resin blend (C) was introduced into an injection molding machine (AZ7000, produced by NISSEI PLASTIC INDUSTRIAL CO., LTD.) and a tabular molded body of 200 mm×180 mm×3 mm was produced.

In this injection molding machine, a film gate was used as a mold, and a full-flighted screw was used as a screw. In this regard, molding was performed under the condition of the resin temperature of 250° C., the mold temperature of 45° C., and the filling rate of 20 mm/sec.

A test piece was produced from the resulting molded body, and the vibration fatigue test was performed.

The results are shown in Tables 3 and 4. Tables 3 and 4 show the number of vibrations, where the test piece was broken under each stress condition.

FIGS. 2 to 5 are drawings of plots of the results shown in Tables 3 and 4.

Furthermore, the number of unopening fiber portions of these molded bodies were counted visually. In order to normalize these numbers, the number of unopening fibers in Example 1 was assumed to be 100, and ratios of the numbers of unopening fibers of the molded bodies in Example 2 and Comparative example 1 thereto were determined as fiber unopening indices on the basis of the following formula.

fiber unopening index=(the number of unopening fibers)÷(the number of unopening fibers in Example 1)×100

Example 2

Long-fiber-reinforced thermoplastic resin particles (A) and a resin blend (C) were prepared in a manner similar to that in Example 1 except that mPP-2 shown in Table 1 was used as the thermoplastic resin (A1) in Example 1. The blend ratios of the individual components are shown in Table 2.

The resulting resin blend (C) was molded as in Example 1, so as to produce a test piece.

The results of the vibration fatigue test are shown in Tables 3 and 4 and FIGS. 2 to 5.

Comparative Example 1

Long-fiber-reinforced thermoplastic resin particles and long-fiber-reinforced particle blend were prepared in a manner similar to that in Example 1 except that mPP-3 shown in Table 1 was used as the thermoplastic resin in Example 1. The blend ratios of the individual components are shown in Table 2.

Comparative Example 2

Long-fiber-reinforced thermoplastic resin particles and long-fiber-reinforced particle blend were prepared in a manner similar to that in Example 1 except that PP-1 shown in Table 1 was used as the thermoplastic resin in Example 1. The blend ratios of the individual components are shown in Table 2.

In this regard, PP-1 was produced by adding 0.1 percent by weight of bis(t-butyldioxyisopropyl)benzene (Perkadox 14, produced by Kayaku Akzo Corporation) serving as a peroxide to a propylene homopolymer (Y-6005GM, melt index (MI) 60, produced by Prime Polymer Co., Ltd.) and performing melt-kneading. The melting point (Tm) of PP-1 (decomposition product of Y-6005GM) was 163° C.

The resulting long-fiber-reinforced particle blend was molded as in Example 1, so as to produce a test piece.

The results of the vibration fatigue test are shown in Tables 3 and 4 and FIGS. 2 to 5.

It is clear that in Comparative example 1, the test piece is broken at the number of vibrations smaller than those in Examples 1 and 2. Furthermore, the tendency was particularly remarkable in the case where the vibration fatigue test was performed at 90° C.

Comparative Example 3

For purposes of comparison with Example 1, a polyolefin resin was produced by melt-kneading all resin components contained in the resin blend (C) in Example 1, that is, mPP-1 (thermoplastic resin (A1)), PP-2 (modified polyolefin resin (A2)), and PP-3 (polyolefin resin particles (B) for dilution), in one operation. Long-fiber-reinforced thermoplastic resin particles were produced by using the resulting polyolefin resin. The resulting long-fiber-reinforced thermoplastic resin particles was used and molding was performed as in Example, so as to produce a test piece. As a result, the dispersibility of glass fibers was significantly poor as compared with Example 1, and many glass lumps due to poor dispersion were generated.

TABLE 1

|  | Thermoplastic resin (A1) (mPP-1) | Thermoplastic resin (A1) (mPP-2) | Thermoplastic resin (mPP-3) | Thermoplastic resin (PP-1) | Modified polyolefin resin (A2) (PP-2) | Polyolefin resin particles (B) for dilution (PP-3) |
|---|---|---|---|---|---|---|
| Type of polymer | Propylene homopolymer | Propylene homopolymer | Propylene homopolymer | Propylene homopolymer | Maleic anhydride-modified polypropylene | Propylene homopolymer |
| Grade* | A-1 | A-2 | A-3 | Decomposition product of Y-6005GM | H-1100P | J-3000GV |
| MI [g/10 min] | 165 | 115 | 165 | 120 | — | 30 |
| Melting point (Tm) [° C.] | 156 | 156 | 147 | 163 | — | — |
| Amount of elution at 90° C. or lower [percent by weight] | 0.2 | 0.1 | 6.0 | 6.5 | — | — |
| λ [sec] | — | — | — | 0.03 | — | 0.22 |
| Mn (×$10^4$) | 4.2 | 4.5 | 4.1 | 4.3 | — | 3.7 |
| Mw (×$10^4$) | 9.3 | 10.4 | 9.4 | 16.2 | — | 20.7 |
| Mz (×$10^4$) | 16.6 | 18.7 | 16.5 | 45.3 | — | 72.9 |
| Mw/Mn | 2.2 | 2.3 | 2.3 | 3.8 | — | 5.5 |
| Mz/Mw | 1.8 | 1.8 | 1.8 | 2.8 | — | 3.5 |

*Everyone is produced by Prime Polymer Co., Ltd.

TABLE 2

| | | | Example 1 | Example 2 | Comparative example 1 | Comparative example 2 | Comparative example 3 |
|---|---|---|---|---|---|---|---|
| Long-fiber-reinforced thermoplastic resin particles (A)* | | Thermoplastic resin (A1) | mPP-1 | mPP-2 | mPP-3 | PP-1 | mPP-1 |
| | | Modified polyolefin resin (A2) | PP-2 | PP-2 | PP-2 | PP-2 | PP-2 |
| | | Content of modified polyolefin resin (A2) [percent by weight] | 2.5 | 2.5 | 2.5 | 2.5 | 2.5 |
| | | Content of glass fiber (A3) [percent by weight] | 50 | 50 | 50 | 50 | 40 |
| | | Melting point (Tm) [° C.] | 156 | 156 | 147 | 163 | 156 |
| | | Amount of acetaldehyde in dissipated gas [μg/g] | 2.5 | 2.3 | — | 6.7 | — |
| | | Bending strength [MPa] | 253 | 251 | 237 | 242 | — |
| | | Bending modulus of elasticity [MPa] | 11,300 | 11,100 | 9,900 | 10,300 | — |
| Polyolefin resin particles (B) for dilution | | | PP-3 | PP-3 | PP-3 | PP-3 | PP-3 |
| Long-fiber-reinforced thermoplastic resin particle blend (C) | Composition ratio [percent by weight] | Long-fiber-reinforced thermoplastic resin particles (A) | 80 | 80 | 80 | 80 | — |
| | | Polyolefin resin particles (B) for dilution | 20 | 20 | 20 | 20 | — |
| | | Content of glass fiber (A3) [percent by weight] | 40 | 40 | 40 | 40 | 40 |
| Molded body | | Bending strength [MPa] | 168 | — | 159 | 162 | 160 |
| | | Bending modulus of elasticity [MPa] | 9,250 | — | 9,100 | 9,130 | 9100 |
| | | Fiber unopening index | 100 | 160 | — | 160 | 3000 |

*Total of thermoplastic resin (A1), modified polyolefin resin (A2), and glass fiber (A3) is 100 percent by weight.

TABLE 3

| | Under condition of 23° C. | | | | | |
|---|---|---|---|---|---|---|
| | Example 1 | | Example 2 | | Comparative example 2 | |
| Stress (MPa) | MD | TD | MD | TD | MD | TD |
| 40 | | | | | | |
| 35 | | | | | | |
| 30 | 2,300 | 244 | 2,597 | 218 | 2,386 | 50 |
| 25 | 11,272 | 1,272 | 12,965 | 1,304 | 5,403 | 304 |
| 20 | 323,764 | 17,509 | 754,474 | 19,059 | 200,579 | 3,707 |
| 15 | 10,000,000 | 463,770 | 10,000,000 | 783,090 | 10,000,000 | 134,150 |
| 10 | | 10,000,000 | | 10,000,000 | | 10,000,000 |
| 5 | | | | | | |

TABLE 4

| | Under condition of 90° C. | | | | | |
|---|---|---|---|---|---|---|
| | Example 1 | | Example 2 | | Comparative example 2 | |
| Stress (MPa) | MD | TD | MD | TD | MD | TD |
| 40 | | | | | | |
| 35 | | | | | | |
| 30 | 231 | 20 | 600 | 37 | 136 | 5 |
| 25 | 12,400 | 465 | 3,852 | 252 | 3,888 | 37 |
| 20 | 232,280 | 2,728 | 68,300 | 3,406 | 22,806 | 874 |
| 15 | 9,219,511 | 107,482 | 10,000,000 | 340,641 | 3,643,249 | 34,203 |
| 10 | 10,000,000 | 995,448 | 10,000,000 | 1,267,151 | | 604,622 |
| 5 | | | | | | |

Industrial Applicability

The molded body formed from the long-fiber-reinforced thermoplastic resin particles (A) or the Long-fiber-reinforced thermoplastic resin particle blend (C) according to the present invention can be favorably used for applications, e.g., automobile parts (front ends, fan shrouds, cooling fans, engine under covers, engine covers, radiator boxes, side doors, slide doors, back door inners, back door outers, outer panels, fenders, roof rails, door handles, door trims, luggage boxes, wheel covers, and handles), two-wheeled vehicle•bicycle parts (luggage boxes, handles, and wheels), house parts (warm water cleaning toilet seat parts, bath room parts, bathtub parts, legs of chairs, valves, and meter boxes), washing machine parts (tubs, balance rings, and the like), fans for wind turbine generators, power tool parts, mower handles, and hose joints.

Reference Signs List

10 die
20 extruder
30 roll of fiber bundle F
40 tension roll group
50 cooling device
60 pull-out roll
70 pelletizer

The invention claimed is:
1. A process for producing a long-fiber-reinforced thermoplastic resin particle blend material (C) comprising dry blending 10 to 90 percent by weight of long-fiber-reinforced thermoplastic resin particles (A) comprising a thermoplastic resin (A1) produced by using a metallocene catalyst, a modified polyolefin resin (A2) modified with an unsaturated carboxylic acid or a derivative thereof, and reinforcing fibers (A3), wherein the following requirements (1) to (5) are satisfied, and 90 to 10 percent by weight of polyolefin resin particles (B) for dilution, where the total of the long-fiber-reinforced thermoplastic resin particles (A) and the polyolefin resin particles (B) for dilution is assumed to be 100 percent by weight:
(1) The amount of modification of the unsaturated carboxylic acid or a derivative thereof is 0.01 to 2 percent by weight in 100 percent by weight of the total of the thermoplastic resin (A1) and the modified polyolefin resin (A2);
(2) The total of the thermoplastic resin (A1) and the modified polyolefin resin (A2) constitute 20 to 70 percent by weight in 100 percent by weight of the total of the thermoplastic resin (A1), the modified polyolefin resin (A2), and the reinforcing fibers (A3);
(3) The reinforcing fibers (A3) constitute 30 to 80 percent by weight in 100 percent by weight of the total of the thermoplastic resin (A1), the modified polyolefin resin (A2), and the reinforcing fibers (A3);
(4) When 25 g of the long-fiber-reinforced thermoplastic resin particles (A) are encapsulated in a 20-L chamber and are stood at 65° C. for 1 hour, the amount of acetaldehyde dissipated from the long-fiber-reinforced thermoplastic resin particles (A) is 3.0 µg/m$^3$ or less; and
(5) The melting point of the resin component in the long-fiber-reinforced thermoplastic resin particles (A) is 150° C. or higher.
2. The process for producing a long-fiber-reinforced thermoplastic resin particle blend material (C) according to claim 1, characterized in that the thermoplastic resin (A1) constitutes 75 to 99 percent by weight and the modified polyolefin resin (A2) constitutes 1 to 25 percent by weight in 100 percent by weight of the total of the thermoplastic resin (A1) and the modified polyolefin resin (A2).

3. The process for producing a long-fiber-reinforced thermoplastic resin particle blend material (C) according to claim 1, characterized in that the thermoplastic resin (A1) satisfies the following requirements (a-1), (a-2), and (a-3):

(a-1) The melt index (MI; resin temperature 230° C., load 21.18 N) is within the range of 100 to 250 g/10 min;

(a-2) The amount of components soluble into o-dichlorobenzene at 90° C. measured by cross fractionation chromatography (CFC method) is 1 percent by weight or less; and (a-3) The molecular weight distribution (Mw/Mn) is less than 3.5.

4. The process for producing a long-fiber-reinforced thermoplastic resin particle blend material (C) according to claim 1, characterized in that the thermoplastic resin (A1) is at least one polymer selected from the group consisting of propylene homopolymers and propylene-α-olefin random copolymers.

5. The process for producing a long-fiber-reinforced thermoplastic resin particle blend material (C) according to claim 1, characterized in that the reinforcing fibers (A3) constitute 20 to 60 percent by weight in 100 percent by weight of the total of the long-fiber-reinforced thermoplastic resin particles (A) and the polyolefin resin particles (B) for dilution.

6. The process for producing a long-fiber-reinforced thermoplastic resin particle blend material (C) according to claim 1, characterized in that the polyolefin resin particles (B) for dilution satisfy the following requirements (b-1), (b-2), and (b-3):

(b-1) The melt index (MI; resin temperature 230° C., load 21.18 N) is within the range of 20 to 70 g/10 min;

(b-2) The relaxation time λ is 0.3 seconds or shorter, where the angular frequency ω=1 (rad/sec), which is calculated from the storage modulus G' and the loss modulus G" measured with a cone & plate rheometer; and (b-3) The molecular weight distribution (Mw/Mn) is within the range of 2.5 to 6.

7. A molded body produced through molding by using long-fiber-reinforced thermoplastic resin particle blend material (C) produced by the process according to claim 1.

\* \* \* \* \*